United States Patent Office 3,139,608
Patented June 30, 1964

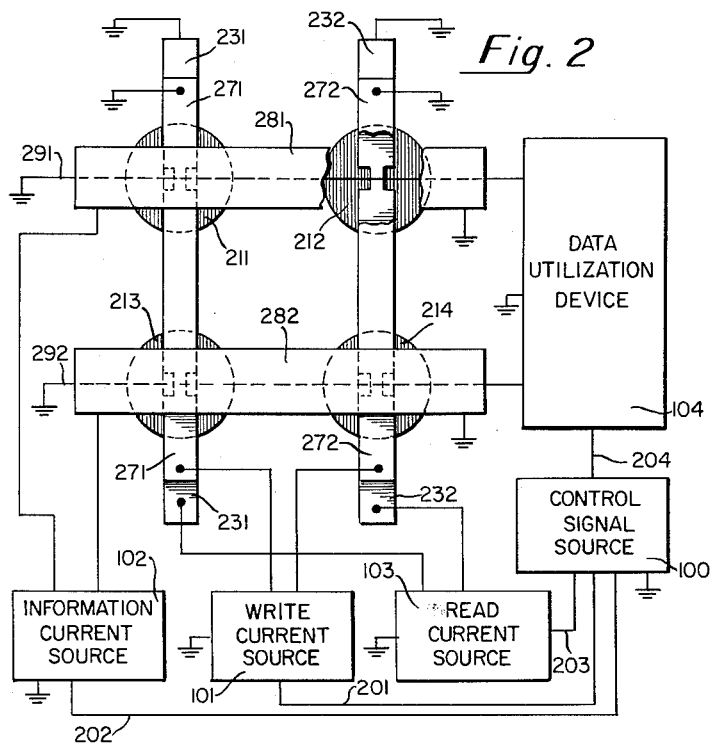
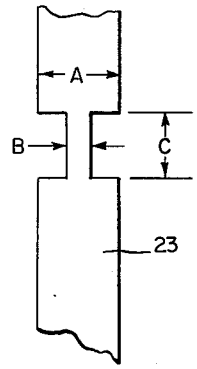
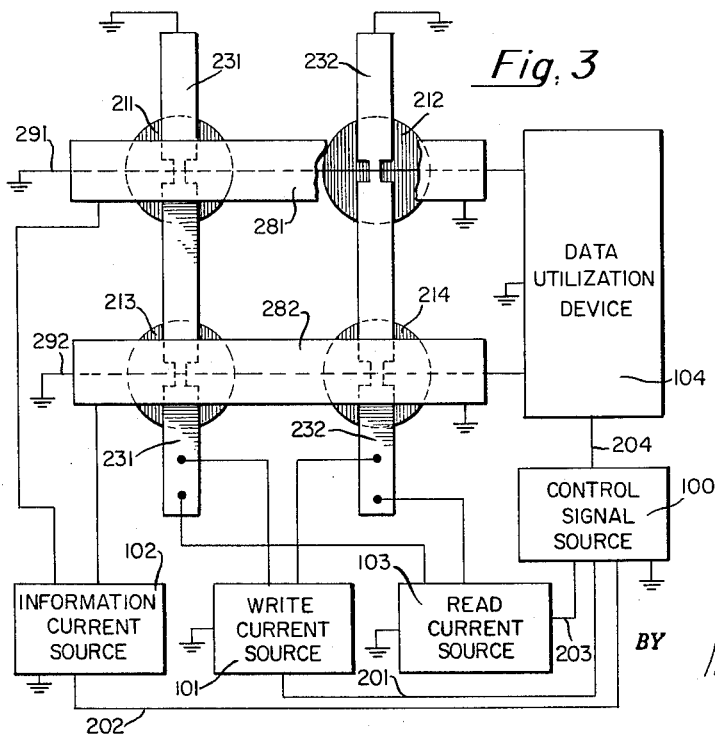
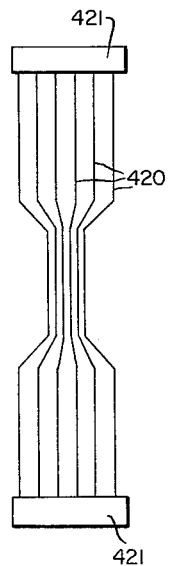
INVENTOR.
FREDERIC C. DOUGHTY
AGENT

3,139,608
MAGNETIZING MEANS
Frederic C. Doughty, Springfield, Pa., assignor to Burroughs Corporation, Detroit, Mich., a corporation of Michigan
Filed Mar. 20, 1959, Ser. No. 800,771
8 Claims. (Cl. 340—174)

In a copending application for United States Patent, entitled "Novel Magnetic Data Store," by Eric E. Bittmann, Serial No. 797,693, filed March 6, 1959, there is disclosed a method of non-destructively reading or determining the direction of magnetization of ferromagnetic films or layers having a preferred direction of magnetization lying substantially in the plane normal to the least dimension of the layer. This method comprises the application of a magnetizing field exceeding the coercive force of the ferromagnetic layer or film element over only a part of the element. The particular means employed by Bittmann to achieve this for the practice of his invention is a conductor which is in proximity to only a part of the ferromagnetic element, so that the field produced by current through such a conductor exceeds the coercive force of the element only over a fractional part of the area of the element. Since current must be brought to and from a suitable current source to feed such a conductor, those parts of the conductor which connect with the current source are kept well away from the ferromagnetic element, and their connection with the conductor portion which is in proximity to part of the ferromagnetic element is made by conductors normal to the plane of the element, to minimize the field produced in the ferromagnetic element by all parts of the conductor except that part deliberately placed adjacent to the element. Such a structure occupies more space than do flat conductors spread on the same plane base which bears the ferromagnetic elements. I have invented a method whereby flat conductors carrying the same current in all parts of their length may be caused to produce differing magnetizing fields immediately adjacent to themselves; and, in the same installation, these conductors may be caused to provide coercive magnetizing fields over only a part of a ferromagnetic film or layer element, or over the whole of such an element.

Briefly, my invention takes advantage of the closeness with which a flat conductive strip may be placed against a ferromagnetic film or layer element, at a distance small compared with the width or length of such a strip. It is a well known general principle of physics that if a force obeys a law that it is inversely proportional to the square of the distance from a point source, then if a uniform distribution of such sources is made along a straight line, the field at distances from such a line short compared with the length of the line will be inversely proportional to the first power of the distance from the line; and for a uniform distribution of such sources along a plane, the field will be uniform in front of the plane at distances short compared with the minimum dimension of the plane. Thus the magnetic field produced by a moving electric charge will be inversely proportional to the square of the distance from the charge; the magnetic field produced by a current moving through a very long wire will be inversely proportional to the first power of the distance from the wire; and the magnetic field produced by a very long and wide sheet of current will be independent of the distance from the sheet. It may be shown further that the field in front of such a sheet will be proportional to the current density per unit of projected area in the current sheet. My invention comprises a conductor whose effective width is altered to vary the current density produced by a total current uniform throughout the conductor. Thus the magnetic field immediately adjacent to the conductor is altered; and it is possible to produce a conductor which, for a given current passed through it, produces only at certain points a magnetizing field greater than the coercive force of the ferromagnetic elements in a magnetic data store. It is also possible (particularly since the cooling of a wide conductive strip is relatively easy and permits high current densities) to pass a greater current through such a strip, and produce everywhere adjacent to it a magnetizing field in excess of the coercive force under consideration. Thus my invention makes it possible to employ a single conductor either to rotate the magnetization of only a part of a ferromagnetic element, or to rotate the magnetization of a whole such element.

Thus one object of my invention is to provide a magnetizing means of compact design which, without being placed at varying distances from the objects of its field, will produce, at the constructor's will, at various points along its length, different magnetizing fields.

Another important object of my invention is to provide magnetizing means particularly well adapted for use in a data store having non-destructive readout.

A further valuable object of my invention is to permit compact and economical construction of data stores employing non-destructive readout of stored data.

Further objects and benefits of my invention will be apparent to those skilled in the art or will become apparent in the detailed specification and description infra.

For the better understanding and explanation of my invention, I provide figures of drawing as follows:

FIGURE 1 represents a conductor having a geometry suitable for use in the practice of my invention;

FIGURE 2 represents an array of four ferromagnetic elements provided with conductors and auxiliary equipment to illustrate one embodiment for the use of my invention;

FIGURE 3 represents an array of four ferromagnetic elements provided with conductors and auxiliary equipment to illustrate another embodiment for the use of my invention; and FIGURE 4 represents a conductor array alternative to that of FIGURE 1.

FIGURE 1 represents a conductor of the type and dimensions which I have actually employed in the practice of my invention. To avoid confusion with numbers, referring to physical parts, the dimensions are indicated by letters. The conductor 23 was of highly conductive material (silver) one mil (thousandth of an inch) thick. The width of the strip A was 3/16 inch; the reduced or notched portion had a width B of 1/16 inch; the length of the notch or reduction C was 1/16 inch. Thus the average current density in the notch was three times the average current density elsewhere in the conductor, and the magnetic field immediately adjacent to the notched portion of conductor 23 was presumably approximately three times as great as the magnetic field immediately adjacent to the remainder of conductor 23. It is apparent that, if the notch is centrally located over a thin film or layer of ferromagnetic material, it is possible to apply to the conductor 23 a current such that the coercive force of the ferromagnetic material will be exceeded only in the immediate vicinity of the notch.

FIGURE 2 represents a data store employing my invention to permit non-destructive reading of data magnetically stored. Four ferromagnetic elements 211, 212, 213, and 214 are represented as circular and, by hypothesis, are endowed with directions of easy or preferred magnetization which, in each element, is in a substantially vertical direction lying within the plane of the paper. It is an experimental fact that thin layers of ferromagnetic material (e.g. iron-nickel alloy 2000 Angstrom units thick) thus provided with a preferred direction may be switched from one sense to the opposite sense by rotation in their own plane of the direction of their magnetization; and, if they are temporarily constrained to be magnetized in a direction non-parallel to their preferred direction, they will, upon removal of the constraining field, drop back into magnetization parallel to their preferred direction in whichever sense is nearest to the direction of the constraining field. Across elements 211 and 213 there is placed a reading conductor 231, and across elements 212 and 214 there is placed a reading conductor 232; the reading conductors are formed as represented in FIGURE 1, with a reduction of section occurring centrally above each of the elements 211, 212, 213, and 214. Over elements 211 and 212 there is placed, centrally traversing the films and the notches or reductions in section of the reading conductors, a sense conductor, a 2-mil diameter enamelled copper wire 291; and similarly over elements 213 and 214, is placed a wire 292. A write conductor 3/16 of an inch wide and one mil thick (of brass shim stock), reference number 271, passes across elements 211 and 213; and a similar conductor 272 passes across elements 212 and 214. Across elements 211 and 212 there extends information conductor 281, here represented as a single strip although, in one successful model, it was composed of two copper strips side by side, each 30 mils wide and 2 mils thick, connected in parallel. Information conductor 282 extends similarly across elements 213 and 214. Thus the order of stacking over any element is: ferromagnetic material, reading conductor, sense conductor, write conductor, and information conductor. It is, of course, obvious that suitable insulation is required to separate the various conductors to prevent sneak currents from flowing through points of accidental contact; thin organic material such as Mylar tape is satisfactory for the purpose. For clarity, the insulation is not represented. The dimensions and specific materials here disclosed are quoted with respect to a particular model and are, equally obviously, subject to wide alteration with respect to substitution of one electrically conductive material for another, to alteration of dimensions, and to substitution of ferromagnetic materials having the specified switching characteristics.

In electrical computing and data processing and handling apparatus, it is conventional to achieve economy of apparatus by causing the same physical assemblies to perform functions as part of different logical entities at different times. The possible variations of such multi-function apparatus are limited only by the designer's ingenuity. For simplicity of explanation, I employ rectangles in FIGURE 2 to represent assemblies of apparatus to perform particular specified electrical (logical) operations; the known art (as exemplified inter alia in the publications of the Institute of Radio Engineers of New York City, New York, particularly the Transactions of the Professional Group on Electronic Computers; and in the book "Waveforms," volume 19 of the Radiation Laboratory Series, published by the McGraw-Hill Book Company, Incorporated, of New York City, N.Y., and Toronto, Ontario, Canada, and London, England), teaches various ways of performing these functions. Rectangle 100 represents a source of control signals, which are applied selectively by channels represented as single lines (although they may be multiplicities of conductors in some or all cases) via channel 201 to write current source 101, via channel 202 to information current source 102, via channel 203 to read current source 103, and via channel 204 to data utilization device 104. The control signal source 100 will perform its directive or control function in accordance with the logical requirements of the gross operation to be performed by the data handling or processing or computing or analogous system which is to employ the present invention; consequently it is not possible to specify its functions in detail, except as they relate to the practice of the present invention.

Recording or writing of data is initiated by the transmission from control signal source 100 via channel 201 to write current source 101 of a signal which causes write current source to send through a selected write conductor (which will, for purposes of illustration be chosen as 271) to ground a pulse of conventional current sufficient in amplitude to produce a magnetizing field exceeding the coercive field of ferromagnetic film or layer elements 211 and 213, thus causing the direction of magnetization of these two elements to be rotated to the left of FIGURE 2. (It is to be assumed herein that any circuit described as involving ground is completed via ground to the current or voltage source.) Next control signal source 100 sends via channel 202 to information current source 102 a control signal which causes information current source 102 to apply to information conductor 281 a current pulse of polarity appropriate to the value of information to be stored in element 211, and to information conductor 282 a current pulse of polarity appropriate to the value of information to be stored in element 212. The write current pulse in write conductor 271 is then caused (either by the design of write current source 101 or by signal from control signal source over channel 201) to cease while the information current in information conductors 281 and 282 still flows. In the absence of a coercive field horizontally directed from write conductor 271, the magnetization of elements 211 or 213 will rotate to alignment with the fields from information conductors 281 to 282 respectively. It is a required characteristic of information current source 102 that it yield pulses which produce magnetizing fields insufficient to rotate the direction of magnetization of a ferromagnetic element (such as 212 and 214) which has not been moved from its stable state by a prior application of a coercive field from a write current in a write conductor such as 272. Thus in the case assumed, film elements 212 and 214 will be substantially unaffected by the information currents in information currents 281 and 282, respectively. It is apparent in the light of the foregoing that if write current had been applied to write conductor 272, the information currents would have altered the direction of stable magnetization of elements 212 and 214. Thus the selection among write conductors determines which elements will be altered in state of magnetization, and the sign of the information current determines what alterations shall take place. A current from information current source 102 through information conductor 281 to ground will, for example, rotate the magnetization of element 211 with the north pole upward; similarly, a current from ground through information conductor 282 to information current source 102 will rotate the magnetization of element 213 with the north pole downward. The various rotations of flux by write and information currents will induce voltages in sense conductors 291 and 292, so that it is a necessary characteristic of data utilization device 104 that it ignore or be unresponsive to voltages appearing on sense conductors 291 and 292 at the time of application of write and/or information currents.

Thus there has been described the operation of writing or recording data in a data store according to the present invention. Some forms of store employing destructive reading operations perform an operation known as "clearing" which amounts to recording all "zero" (or all "one") signals in all storage elements. Since reading in the store of FIGURE 2 is non-destructive, no such simple clearing operation is available, unless information current source 102 is provided with the ability to apply to all information conductors 281 and 282 uniform clearing current pulses so great that they unassisted produce at each ferromagnetic film or layer element 211, 212, 213, and 214 a field exceeding the coercive field of the elements, and thus rotate all the elements to a direction or sense corresponding to a cleared condition. A simple alternative to such a drastic operation is to clear by writing all "zeros"' or all "ones" into the elements which it is desired to clear.

The reading operation is initiated by the transmittal via channel 203 from control signal source 100 to read current source 103 of a signal which causes read current source 103 to apply to a selected read conductor (for example, 231) a read current pulse of such amplitude that it will rotate the direction of magnetization of a part only of film elements 211 and 213 in a given direction. The part of an element suffering such rotation must be a sufficiently small fraction of the whole element that, upon cessation of the reading field, the unrotated parts will be sufficient to restore the rotated part to its original orientation of magnetization without themselves suffering any permanent alteration of their own direction and intensity of magnetization. In order that data utilization device 104 may make use of the read signals, it is necessary that control signal source 100 transmit via channel 204 a control signal which will render data utilization device 104 sensitive to voltages induced on sense conductors 291 and 292 by the rotation of the central parts of the elements selected for reading (211 and 213, by the hypothesis of the example). It is an interesting fact that there is no necessary relation between the directions of the read current and of the write current; since the stable position of the magnetization of an element is either with the north pole down or with the north pole up, along a substantially vertical line in either case, a read pulse producing rotation to the left, or one producing rotation to the right will produce counterclockwise rotation for one original stable condition, i.e., one value of stored data, and clockwise rotation for the other orignial stable condition, i.e., the other value of stored data. Thus the sign of the change of flux linkages with the sense conductors 291 and 292 will differ depending upon the original stable direction of the element, and the voltage induced in sense conductor 291 or 292 during the rotation will differ similarly. Data utilization device 104 is, by specification, capable of interpreting the polarity of the voltages appearing upon the sense conductors 291 and 292 according to their indication of the remanent or stable sense of magnetization of the elements (281 and 282, in the assumption of the present example) being read. The reading operation has now been described; the reader skilled in the art will observe the extreme simplicity achieved by the elimination of any regeneration step for returning to the store data destroyed in reading out.

FIGURE 3 represents an alternative form of data store embodying my invention in a somewhat simpler form than the representation of FIGURE 2. The structure of the store proper is the same as the representation of FIGURE 2, except that in FIGURE 3 write conductors 271 and 272 are omitted, and their function is taken over by read conductors 231 and 232, respectively. Read current source 103 remains connected to conductors 231 and 232; and write current source 101 is also connected to conductors 231 and 232; it is necessary that current sources 101 and 103 be so designed as to present a high impedance at their outputs when they are not producing current outputs. The current output from write current source 101 is made sufficient so that it produces even in the unconstricted parts of condutcors 231 or 232 a current density sufficient to produce everywhere over elements 211 and 213 or 212 and 214 a magnetizing field exceeding the coercive force of the elements. Thus a sufficient current flowing through conductors 231 or 232 can produce exactly the same operative effect as a current flowing through conductors 271 or 272 of FIGURE 2. It is, of course, possible to design a single source of write and read current which produces outputs of two different amplitudes depending upon the control signals actuating it.

The currents employed in an operating embodiment according to FIGURE 2 were: 0.8 ampere writing current, 0.4 ampere information conductor current, 0.4 ampere read conductor current. For an operating embodiment according to FIGURE 3, the currents required were the same. It may be observed that the ratio of write current to read current in the more sophisticated embodiment of FIGURE 3 is not quite the same as the ratio of conductor widths at the unconstricted parts. This is explicable on the basis that the field of a current element appears everywhere in the space around it, so that ideal fields are not actually found; also, current flow adjacent to the constriction in a conductor will not all be parallel to the axis of the conductor, but will tend to bunch in, producing deviations from the ideal picture herein employed for simple explanation of my invention. Also, since pulses of current approximately 400 millimicro seconds long were employed, skin effect would alter the current distribution from that which would exist for approximately direct-current conditions.

While I have represented the concentration of current as effected by notching a conductor, it is obvious from the known laws of physics that, given the basic concept of concentration of current to produce local increases in magnetizing fields, it is possible to achieve this same physical action in other ways, as by folding parts of a conductive tape upon itself, or by employing a braid of fine wires and leaving such a braid to expand to its natural width over most of its length but constricting it by application of tension at those points where it is desired to produce an increased magnetizing field. The laws governing the production of magnetizing fields by movement of electrical charges are sufficiently well known and understood that it would be impossible to recite all the stratagems to which routine skill in the art might lead in the production of equivalents of my notched conductor. The simplest and most obvious equivalent is represented in FIGURE 4, where a number of fine wires 420 are laid parallel to each other and are connected in parallel by connection blocks 421, and the equivalent of a constriction is produced by laying the wires 420 over each other to produce a concentration of magnetizing fields.

Having disclosed, specified, and taught the use of my invention, I claim:

1. In a data store comprising ferromagnetic layer elements having each a preferred direction of magnetization which is substantially the same over an entire said element, writing means for rotating the direction of magnetization of at least one said element to a direction intermediate between the two stable directions of said element, information means for directing the return of the direction of magnetization of said element from said intermediate direction to a selected stable direction representative of the information being stored, and sensing means for detecting the rotation of the direction of magnetization of a part of said element, the improvement comprising current-carrying magnetizing means, adjacent to said element, and having adjacent to one part of said element a reduced current-carrying cross section.

2. In a data store comprising ferromagnetic layer elements having each a preferred direction of magnetization, writing means for rotating the direction of magnetization of at least one said element to a direction intermediate between the two stable directions of said element, information means for directing the return of the direction of magnetization of said element from said intermediate direction to a selected stable direction representative of the information being stored, and sensing means for detecting the rotation of the direction of magnetization of a part of said element, the improvement comprising current-carrying magnetizing means, adjacent to said element, and having adjacent to one part of said element a portion of said current-carrying magnetizing means formed in such a manner that the average current density therein is greater than the current density in the remaining portions of said magnetizing means.

3. In a data store comprising ferromagnetic layer elements having each a preferred direction of magnetization, writing means for rotating the direction of magnetization of at least one said element to a direction intermediate between the two stable directions of said element, information means for directing the return of the direction of magnetization of said element from said intermediate direction to a selected stable direction representative of the information being stored, and sensing means for detecting the rotation of the direction of magnetization of a part of said element, the improvement comprising current-carrying means having a first cross section for current flow and a second cross section for current flow, less than the said first cross section and extended on proximity to a part only of the said element.

4. In a data store comprising ferromagnetic layer elements having each a preferred direction of magnetization, writing means for rotating the direction of magnetization of at least one said element to a direction intermediate between the two stable directions of said element, information means for directing the return of the direction of magnetization of said element from said intermediate direction to a selected stable direction representative of the information being stored, and sensing means for detecting the rotation of the direction of magnetization of a part of said element, the improvement comprising a conductor whose area projected upon the surface of the said element is reduced over a part only of the said element.

5. Nondestructive read-out means for conducting current in close proximity to magnetic material having a substantially rectangular hysteresis characteristic with a well-defined value of coercive force and being capable of storing a plurality of bits of binary information, said means producing by the passage of such current a magnetizing field which exceeds the said coercive force in only those parts of said magnetic material situated in the immediate vicinity of first portions of such means and is less than the said coercive force in the remainder of said magnetic material exclusive of said parts situated in the immediate vicinity of second portions of such means, comprising a single flat strip conductor of uniform thickness which is reduced in width at the said first portions thereof, and wide at the said second portions thereof, the said reduced width being less than one half of the width of the said wide portions, the total current in the said strip being constant throughout its length, the current density at any point in the said strip being inversely proportional to its width at the said point.

6. A data store comprising, in combination, a storage element in the form of a magnetically bistable thin film disposed in a single plane and having a preferred direction of magnetization substantially the same everywhere in the element and substantially parallel to the plane thereof; writing conductor means adjacent to the element and extending parallel thereacross and adapted by passage of electrical current therethrough to produce magnetizing fields to selectively rotate the direction of magnetization of the entirety of the storage element; sense conductor means adjacent to the element and extending parallel thereacross at right angles to the preferred direction of magnetization thereof and operable to detect the rotation of magnetization in the element; a reading-out conductor for applying a magnetizing field to a part of the element to rotate the direction of magnetization thereof, said reading-out conductor comprising an electrically conductive strip of uniform thickness overlying the storage element in close parallel relation thereto, a portion of the section of said strip overlying said magnetic element having a reduced width, said reduced width portion of said section acting to increase the average density of the current flow therethrough and being effective to produce a greater magnetizing field for rotating only the magnetization in that part of the storage element immediately thereunder to a magnetically unstable position.

7. A data store comprising, in combination, a storage element in the form of a magnetically bistable thin film disposed in a single plane and exhibiting a general circular formation, the magnetization of the element having a preferred orientation substantially the same everywhere in the element and substantially parallel to the plane thereof; writing conductor means adjacent to the element and extending parallel thereacross and adapted by passage of electrical current therethrough to produce magnetizing fields to selectively rotate the direction of magnetization of the entirety of the storage element; sense conductor means adjacent to the element and extending parallel thereacross at right angles to the preferred direction of magnetization thereof and operable to detect the rotation of magnetization in the element; a reading-out conductor for applying a magnetizing field to a portion of the element to rotate the direction of magnetization thereof, said reading-out conductor comprising a flat strip conductor of uniform thickness extending substantially diametrically across the storage element and in close parallel relation thereto, said reading-out conductor being reduced to less than one half its width over only the central portion of the storage element, said reduced portion of the reading-out conductor increasing the density of the electric current therethrough and being effective to produce a magnetizing field to rotate the direction of magnetization of only said central portion of the element to a magnetically unstable position; said sense conductor means detecting said rotation of the magnetization of said central portion of the element by the current in the reading-out conductor and the magnetization of the annular portion of the element surrounding the central portion acting to restore the direction of magnetization of the latter to a stable orientation of magnetization.

8. A data store comprising at least one magnetic storage element capable of assuming bistable states of magnetic remanence along a preferred direction of magnetization for storing a bit of binary information, magnetizing means including a conductor carrying an electric current for nondestructively reading out the information stored in said magnetic element, said conductor being formed in such a manner that the current paths therein are concentrated in selected portions thereof, said conductor being positioned with respect to said magnetic element so as to have at least one of said selected portions of said conductor situated in close proximity to a part of said element, said current flowing through said selected portions of said conductor being effective to apply to said part only of said element the increased magnetizing field existing immediately external to said selected portions of said conductor whereby the direction of magnetization of only said part of said element is altered from one of said bistable states of magnetic remanence to a magnetically unstable position.

References Cited in the file of this patent

UNITED STATES PATENTS

| | | |
|---|---|---|
| 1,729,713 | Dicke | Oct. 1, 1929 |
| 2,719,965 | Person | Oct. 4, 1955 |
| 3,030,612 | Rubens et al. | Apr. 17, 1962 |

FOREIGN PATENTS

| | | |
|---|---|---|
| 1,190,683 | France | Oct. 14, 1959 |
| 906,831 | Germany | Mar. 18, 1954 |